Aug. 14, 1951 A. R. PLACK 2,563,957

RECORD HOLDER

Filed Oct. 25, 1949 2 Sheets-Sheet 1

INVENTOR.
ALBERT R. PLACK

BY Fay, Golrick & Fay

ATTORNEYS

Aug. 14, 1951

A. R. PLACK 2,563,957

RECORD HOLDER

Filed Oct. 25, 1949

2 Sheets-Sheet 2

INVENTOR.
ALBERT R. PLACK
BY Fay, Golrick & Fay
ATTORNEYS

Patented Aug. 14, 1951

2,563,957

UNITED STATES PATENT OFFICE 2,563,957

RECORD HOLDER

Albert R. Plack, Maple Heights, Ohio

Application October 25, 1949, Serial No. 123,456

3 Claims. (Cl. 312—19)

This invention is particularly directed to a record disk holder having record selection and ejection means combined with the holder. This invention has for its purpose the storage of a multiplicity of records in various sizes in compact storage with convenient means to display the titles of the records on an identity drum and to select and eject a particular record from the holder.

The difficulty presented with present devices is that the records may be stored with a minimum spacing but with no means for selecting a certain record. Trough type record holders, of themselves, are not new or when combined with selection and ejection means, but in this device I have combined a trough record holder that compactly stores fifty or more records with a rotatable record identity drum and a slidable indicator lever and ejection arm whereby a certain record may be individually selected and ejected from the trough by selecting the name of the record only. I have particularly invented a holder combined with means for identifying and selecting one of a multiplicity of records on an identity drum. I have correlated the identification marker of each record with the exact space in the trough so that a single indicator arm and ejector lever will point to a specific record and then may be used to eject the record a short distance where it may be lifted off by hand from the record trough. In combination with this, I have invented a notched bail designed to rock upon a longitudinal axis between the forks of my indicator lever so that my indicator lever will move across the longitudinal face of the record holder under the weight of the notched bail and stop at a particular notch where the other fork of my indicator lever will be pointing to a particular record. Depressing the ejector lever at this particular moment will lift the record from the trough a short distance where it may be lifted off by hand.

An object of my invention is to design a record holder having a novel identity drum with selection and ejection means in which the means is a lever combining the indicator of particular records on the identity drum with ejection means on the other end of the lever whereby a single record can be indicated, selected and ejected in a novel manner.

Another object of my invention is to design a record holder of simple stamping that may be easily constructed with the novel means for indicating, selecting and ejecting disk records consisting of a translatable indicator lever and ejector designed to be moved across the face of the record holder to point to a specific title upon a rotatable identity drum and which lever may be moved under the pressure of a notched bail to stop at a particular notch in synchronism with the exact position of the record in the trough.

These and other objects will be apparent from a more complete description of the device and the manner in which it operates which follows.

Figure 1:
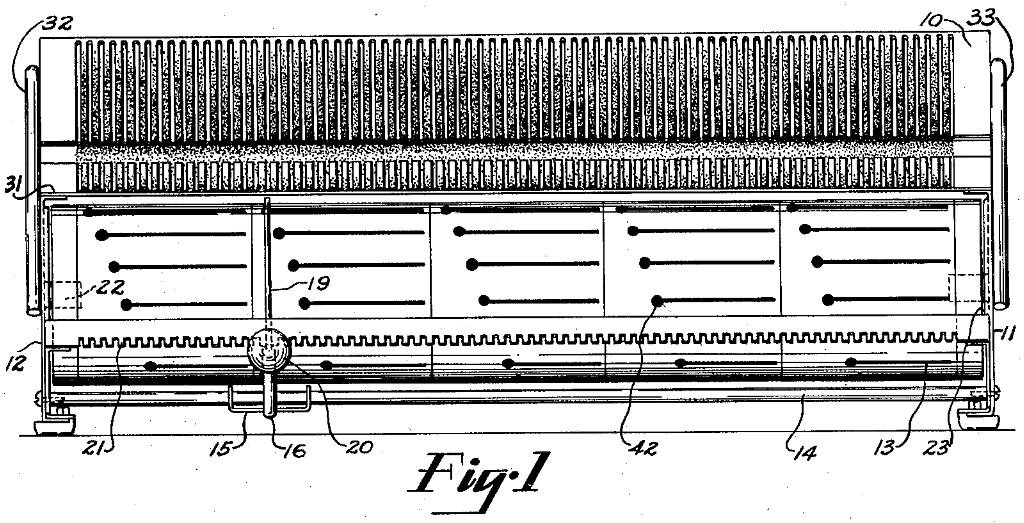
Fig. 1 is a front view of my record holder.
Figure 2:
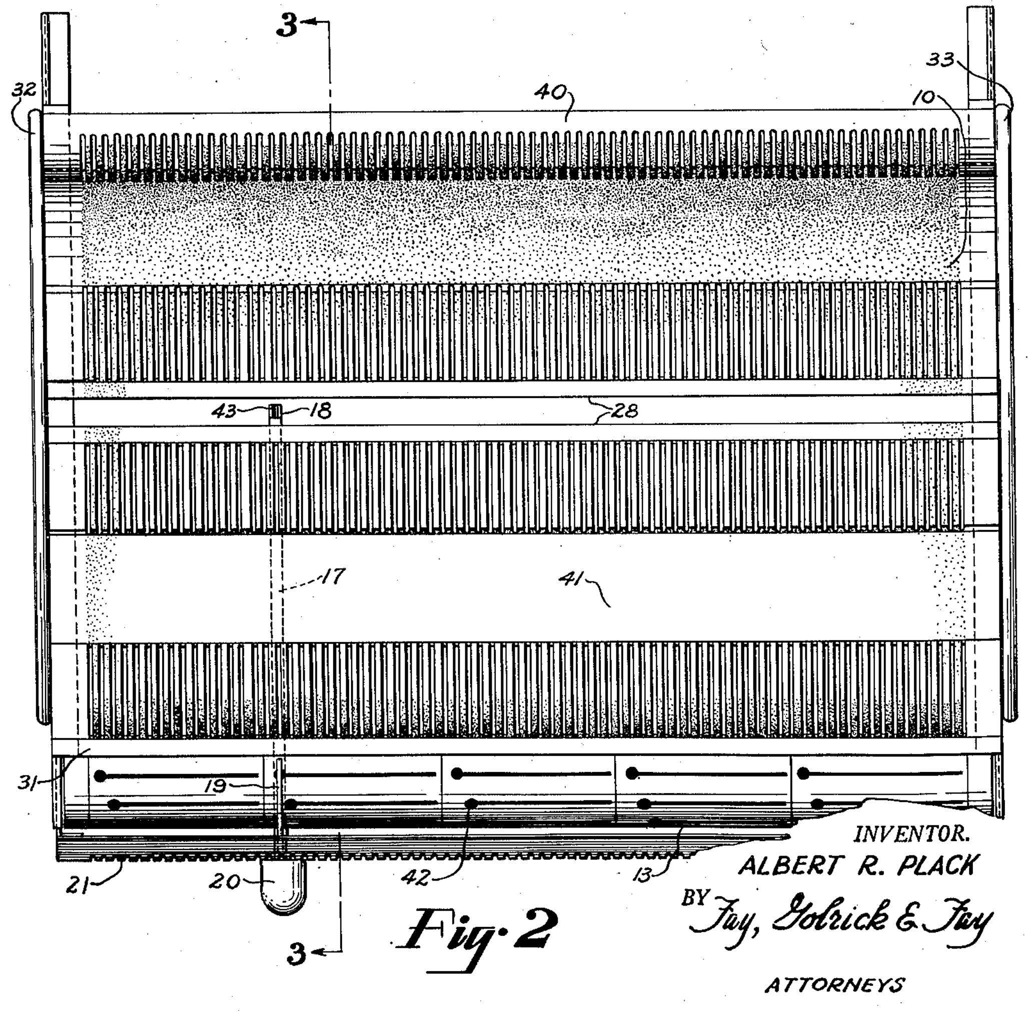
Fig. 2 is a top view of the record holder.

In Fig. 1 I have shown my record holder consisting of a carrier trough 10 having end plates 11 and 12 supporting the trough, a rotatable identity drum 13 and a cross bar 14. Mounted on the cross bar is a yoke 15 and attached thereto is a lever 16. The lever 16 has a longitudinal extension 17 projecting under the trough to a vertical arm of the lever 18. The other arm of the lever consists of an indicator arm 19 and a handle 20. Mounted between the fork formed by these two arms is a notched bail 21 that is tiltably mounted upon the same cross bar 14 and extends across the face of the record holder. The lower surface of the notched bail has a multiplicity of notches with a spacing similar to that of the trough so that each particular notch is in synchronization with a slot in the trough. The rotatable drum is mounted between the end plates 11 and 12 upon a stub axle 22 mounted upon end plate 12 and a corresponding stub axle 23 upon end plate 11. In addition, the drum is mounted rather tightly so that it may be rotated under a slight friction that is desirable to prevent free spinning of the drum. At any one time approximately one-third of the selections on the drum will be visible from the front of the record holder.

Figure 4:
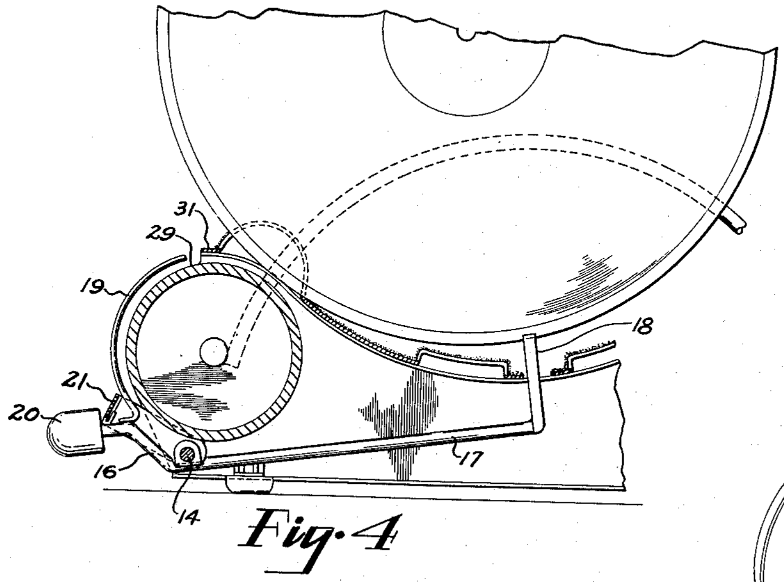
Fig. 4 is a partial sectional view of my record holder showing the ejector lever in the down position.

The trough of the record holder consists of two sheet metal stampings 40 and 41 each having two ridge sections pressed interiorly out of the curved surface of the trough. These sections are 24, 25, 26 and 27, respectively. The trough is made by having a multiplicity of slits formed in each of these four sections. Each section thus forms a slight ridge projecting about one-quarter inch interiorly of the trough and has cut in this ridge or plateau a number of slits corresponding to the number of records to be mounted in a trough. The records are thus held in the trough by these ridges and slits and prevented from warping or bending. The ridge 27 nearest the front of the trough is semi-cylindrical and serves as a guide slot for the other ridges. The central part of the trough between the arcuate stampings 40 and 41 consists of a transverse slot 28 through which the lever arm extension 18 projects to eject the records. This slit will permit the indicator and ejector arm with its extension arm 18 to project through the under portion of the trough at all positions and eject a record a short distance as illustrated in Fig. 4. In this view the indicator arm 16 with its extension arm 17 has been depressed by touching ejection button 20 to lift the record from the trough. The amount of vertical movement of the lever is as shown by the distance the vertical extension arm 18 projects into the trough between the stampings 40 and 41. The indicator arm 19 that arcuately conforms to the surface of the identify drum is lifted from the face of the drum by this operation as is shown by the spacing at 29.

In ordinary usage, the record holder operates as follows: The titles of approximately fifty records are printed upon a rotatable identity drum in a series of about five columns. Each record has the title of the selection that appears on each side listed upon this drum. The left marker of each selection is known as an indicator marker 42 and is mathematically calculated to be at a spacing that will correspond with the spacing between the records mounted in the trough. This spacing is about $\frac{3}{16}''$ with $\frac{1}{8}''$ for the spacing between records and $\frac{1}{16}''$ for the slot. The indicator arm 19 is translated across the face of the identity drum by moving the handle 20 crosswise on cross bar 14 under the pressure of the rocking notched bail 21. This bail has a series of notches and under its own weight will press down upon the connecting handle 20. When a particular selection is reached, the handle will be adjusted to the particular notch corresponding to the identity marker of the selection. This notch corresponds to the exact position of the record. It aids in finding a selection and in preventing the lever arm from picking up more than one record at a time. In addition this helps to prevent the arm from sliding between two records should the drum and lever arm extension be out of adjustment.

In order to eject the selection the handle 20 is depressed on cross bar 14 as a fulcrum and vertical extension 18 on the opposite end of the lever will catch the record in a V-shaped notch 43. The record will be displaced a small amount from the trough so that it may be picked off the trough by hand. The notched bail rotates on a pivot and in ejection follows the handle down to insure alignment of the lever and the particular notch on the bail.

To replace the records one of two systems may be used. The records may be serially numbered and marked on the name plate of each record. A corresponding number may then be placed on the notched bail or upon the surface 31 immediately in front of the guide slots 27. Thus, the record may be readily returned to the record holder by number. If desired the name of the record may be found upon the indicator drum and the indicator lever may be moved to the identity mark. In this manner the indicator arm 19 will serve as a marker to guide the outer rim of the record to its proper slot.

With my system I place the records at $\frac{3}{16}''$ intervals in one modification, the record slot is $\frac{1}{16}''$ and the spacing between slots $\frac{1}{8}''$. This provides a compact system holding the records within a minimum of space while providing sufficient spacing to operate the mechanism for selecting and ejecting the records from the holder. Upon the ends of the trough are mounted guards 32 mounted upon end plate 12 and a corresponding guard 33 on end plate 11. These consist of a rod bent in a semi-circle and fixedly mounted to the end plates acting as an end support for the records or as a handle when desired.

Figure 7:
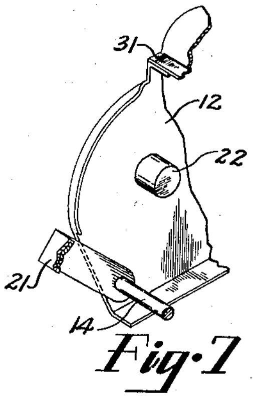
Fig. 7 is a partial perspective view of an end plate.

The details of the end plate are disclosed in Fig. 7 where the stub axle 22 is shown fixedly connected to end plate 12. The connection between the cross bar 14 and the notched bail 21 are shown. This may be tilted through a limited arc on the end plates. The notched bail extends as is seen from these details across the entire face of the record holder.

Figure 3:
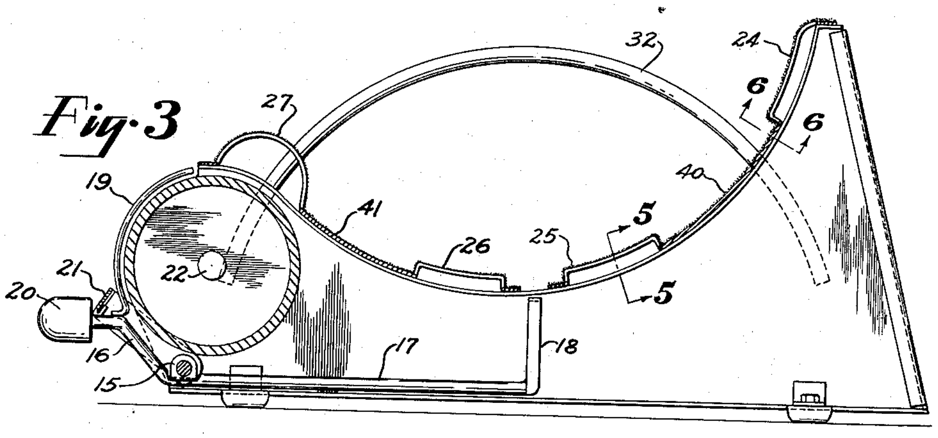
Fig. 3 is a cross sectional view along the lines 3—3 of Fig. 2.
Figure 5:
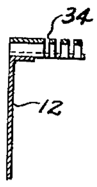
Fig. 5 is a partial sectional view along the lines 5—5 of Fig. 3 showing details of the grooved ridges that hold the records.
Figure 6:
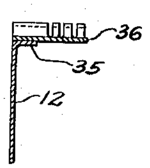
Fig. 6 is a partial sectional view along the lines 6—6 of Fig. 3 showing another view of the ridges.

In Fig. 5 there is illustrated a cross section along the lines 5—5 of Fig. 3 where the ridge 25 and slots 34 are shown contacting end plate 12. This ridge is as previously described to support the edges of the records within the slots formed therein. As is seen from this view there is no support on the ends of the ridge to the end plate. In Fig. 6 the manner in which the trough is mounted to the end plate is shown. The end plate 12 has a flange 35 projecting inwardly that is fastened to the arcuate trough stamping. Also, in Fig. 6 there is shown the detailed construction of ridge 24 which holds the record upon the upper face of the holder in a manner similar to ridge 25 against trough 40 at position 36.

Guide ridge 27 is of a semi-cylindrical construction to provide a deeper slot upon which to guide and hold the record. It is mounted just above the identity drum and projects interiorly of the trough as shown particularly in Fig. 3.

Upon the surface of the trough and around the guides the metal stampings are sprayed with a fibrous material known as flocking to protect the records from scratching.

Although I have described but one form of the invention, it is to be understood that other modifications might be made, all falling within the scope of the claims which follow.

I claim:

1. In a disk record holder for phonograph records, combined with selection and ejection means, the combination of a pair of end plates, an arcuate supporting trough between the end plates having individually spaced slots therein to position the records in a vertical position, a rotatable record identity drum having spaces for record names and exactly positioned identification markers mounted between the end plates, a cross bar mounted in a similar manner between said end plates, an ejector and indicator lever transversely slidable on the cross bar and pivotally mounted thereon having one arm as an indicator and the other as an ejector extension arm whereby any one of a multiplicity of records may be selected and ejected by rotating the drum so the identification of the record is visible on the identity drum, by positioning laterally the ejector and indicator lever to the title of the record desired on the drum, by moving the lever to the exact record identification marker adjacent said record title and by operating the lever to eject the record.

2. In a disk record holder for phonograph records, combined with selection and ejection means, the combination of a pair of end plates, an arcuate supporting trough between the end plates having individually spaced slots therein to position the records in a vertical position, a rotatable record identity drum having spaces for record names and exactly positioned identification markers mounted between the end plates, a cross bar similarly mounted between said end plates, an ejector and indicator lever transversely slidable on the cross bar and pivotally mounted thereon, having one arm as an indicator and the other as an ejector extension, a notched bail fastened on said cross bar and extending across the width of it between the lever and the drum capable of tipping with the movement of the lever arm whereby any one of a multiplicity of records may be selected and ejected by rotating the drum so that the identification of the record is visible on the identity drum by positioning laterally the ejector and indicator lever to the title of the record desired on the drum in order to move the lever to the exact notched position on the bail which corresponds with the record identification marker adjacent said record title and by operating the lever to eject the record.

3. In a disk record holder for phonograph records, combined with selection and ejection means, the combination of a pair of end plates, an arcuate supporting trough between the end plates having individually spaced slots therein to position the records in a vertical position, a rotatable record identity drum having spaces for record names and exactly positioned identification markers mounted between the end plates, a cross bar similarly mounted between said end plates, an ejector and indicator lever transversely slidable on the cross bar and pivotally mounted thereon having one arm forked as an indicator and operating handle and the other as an ejector, a notched bail fastened on said cross bar and between the forked arms of the lever, extending across the width of the cross bar and capable of tipping with the movement of the lever arm whereby any one of a multiplicity of records may be selected and ejected by positioning the drum so that the identification of the record is visible on the identity drum, by positioning laterally the ejector and indicator lever to the title of the record desired on the drum in order to move the lever to the exact notched position on the bail, by translating the handle along the series of notches in the bail to the notch which corresponds with the record identification marker adjacent said record title and by operating the lever to eject the record.

ALBERT R. PLACK.

REFERENCES CITED

The following references are of record in the file of this patent:

UNITED STATES PATENTS

| Number | Name | Date |
|---|---|---|
| 1,667,216 | Nigra | Apr. 24, 1928 |
| 1,815,830 | Carlisle | July 21, 1931 |
| 2,352,710 | Hart | July 4, 1944 |

FOREIGN PATENTS

| Number | Country | Date |
|---|---|---|
| 399,187 | Great Britain | Oct. 2, 1933 |